Figure 1:
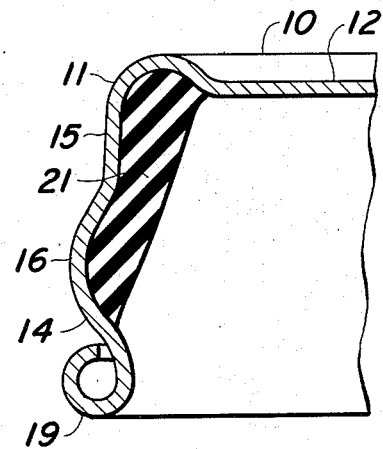

Feb. 7, 1956 A. B. FOYE 2,733,827
SIDE SEAL CONTAINER CLOSURE
Filed Dec. 22, 1951

Inventor
Allen B. Foye
By Theodore C. Browne
Attorney

2,733,827
SIDE SEAL CONTAINER CLOSURE

Allen B. Foye, West Bridgewater, Mass., assignor to W. R. Grace & Co., Cambridge, Mass., a corporation of Connecticut Application December 22, 1951, Serial No. 262,929

4 Claims. (Cl. 215—40)

There is an insistent demand for a resealable closure for baby foods. The mother should be able to take out sufficient food for the baby's meals, reseal the jar tightly, and store what is left in the refrigerator. Unless clamping devices are provided, only a side seal closure, i. e., a closure in which the sealing material is compressed between a down turned skirt on the cap and an effectively vertical wall adjacent the mouth of the jar, is capable of resealing small jars. But when such closures have been used to package puréed baby foods, very large losses have occurred. One of the defects has been "Black Neck." Another has been the pinpoint perforation of the metal of the closure. Both have been so serious that they have been exhaustively investigated.

A side seal closure demands that the glass jar be provided with a smooth, effectively cylindrical side wall finish on the exterior wall adjacent the mouth. In the conventional side seal closure, the metal part or cap has a widely flaring skirt, and usually is beaded inwardly. The sealing element is a tough, vulcanized ring of rubber, the lower margin of which is pinched between the inturned bead and the flaring skirt of the cap. Thus the rubber is held securely in place. Above the flaring skirt, there is a short cylindrical section which merges with the flat top panel of the closure.

In sealing such a jar with this closure, air is exhausted from the head space above the contents in closing machines which produce a vacuum either mechanically or by the condensation of steam. In either case, the cap is usually pushed down onto the jar by mechanical means. As the closure is pushed onto the jar, the rubber seizes the glass; but since the lower margin of the rubber sealing band is crimped in the bead, the strain which is imposed on the rubber, tending to pull the rubber out of the bead, is resisted by the bead metal which acts as a marginal clamp. The upper margin of the rubber band, therefore, slides down on the cylindrical glass finish. However, the diameter of the cylindrical portion of the closure above the flare, plus the thickness of the rubber sealing band, is insufficient to allow the rubber to fit over the neck of the jar without distorting the rubber. Thus, the rubber is deformed into a sealing zone of somewhat indefinite width around the cylindrical glass finish. In this area the rubber is tightly pressed against the glass.

As jar after jar is blown, there is a progressive degeneration of the surface of the glass mold. The molten glass picks up whatever irregularities develop, and so minor defects in the glass finish begin to appear as the surface of the glass mold wears or becomes carbonized. Gross irregularities in the finish are, of course, rejected by inspection, but even with rigid inspection, microscopic irregularities always exist. It is obvious that the rubber must be a resilient and relatively tough substance; otherwise, it could not withstand the strains in the closing operation. It is also obvious that tough rubber in such a pressed-on gasket may not be able to follow the minute contours in the glass with absolute fidelity. Then, because the sealing gasket must be tough, resilient and somewhat stretched, the rubber may bridge some of these small defects. Bridging permits microcapillaries to exist between the sealing ring and the glass.

By using tagged atom techniques, it has been shown that, in the case of jars that fail, oxygen does get into the head space. It must be assumed that it gains entrance through these microcapillary passages, which, although they are too small to allow bacteria to enter and contaminate the food contents, do allow molecular oxygen to enter the jar. Many baby foods contain ingredients which react with oxygen. The reaction products are usually dark colored. The result of oxygen infiltration is that a deeply discolored surface layer is formed. This is known as "Black Neck."

The reasons for pinpoint perforation of the tin plate are more obscure, but sufficient is known to make it appear reasonable that in this case also, oxygen, by acting as a depolarizer, is the principal offender and that pinpoint perforation is the result of electrolysis. It has also been established that pinpoint perforations occur most commonly in those areas of the cap which have been damaged or which have been subjected to substantial mechanical stress. Some evidence seems to lead to the conclusion that, if the crystal grains of the metal have been fractured by mechanical working, pinpoint perforation is likely to occur in the fractured areas. Other observations lead to the conclusion that severe mechanical working causes fractures in the coating on the inside of the cover and develops microcracks through the enamel. There is some evidence that, if these cracks cross an area where the tin coating on the steel is also cracked or is porous, pinpoint perforation is most likely to occur at that particular point.

Very effective heat and pressure moldable sealing compositions which adhere to the enamel are known in the closure art. Under the heat and pressure of the closing operation, these compounds soften and flow. In flowing, such compositions enter and close the microscopic channels. In addition, since the the compositions are applied by flowing, they can be so placed as to cover all the bent areas of the metal. It would appear, therefore, that the use of such compositions as the sealing element of side seal closures would materially reduce both "Black Neck" and pinpoint perforation.

When, however, such compositions were used as the sealing element in conventional side seal caps, two difficulties arose. First, since the composition softens with heat, the whole sealing element frequently, when the closure was heated prior to closing, would be pushed ahead of the glass and skid out of position over the rim of the jar. Unlike sealing elements formed from preformed rubber rings, sealing elements of such compositions cannot be retained in position by inserting the element into an open rolled bead and subsequently crimping the bead. Secondly, I noticed that in most instances, a portion of the sealing element was forced over the bead of the container into the head space. Whenever this occurred, that portion of the element within the head space lifted away from the closure and in lifting frequently stripped the enamel from the closure. This effect occurred both in closures having a flat top panel and in closures having the normal wide channel formed by depressing the top panel.

In studies made on container sealing compositions leading to the present invention, I determined that the direct compressional force exerted in sealing the jar exceeded the elastic force of the material, and that directly under the point of applied pressure the substance was permanently deformed by plastic flow at the sealing temperatures. However, in adjacent areas where the pressure fell away, the elastic force was paramount. Thus, when any sealing compound is extruded into the head space of a sealed jar that sealing compound must be pulled away from the top panel by the elastic force.

Since a heat moldable elastomer capable of plastic flow can only operate if it adheres to the enamel coating, and because frequently the specific adhesion of the elastomer to the enamel is greater than the specific adhesion of the enamel to the tin plate or to the base coat, the pulling away from the top panel of any compound which is extruded into the head space is accompanied by the stripping of the enamel from above the extruded mass. When closures on which this had occurred were sealed on test jars, I found that the metal above the extruded mass had been badly attacked during the test storage period. From this it appeared that it is necessary to prevent insofar as possible any extrusion of compound into the head space and to maintain whatever compound is in contact with the contents of the jar or its interior atmosphere in direct compression.

I discovered that if two angularly disposed mechanical anchoring channels are formed in the cap these two mechanical anchorages in conjunction with the increased area available for the adhesive contact of a heat moldable gasketing composition to the lining enamel act in a peculiar and an advantageous way, but the position and the dimensions of these channels in relation to the dimensions of the glass finish and the positioning of the lining in the cap are critical, as will be explained. Caps having these critical dimensions not only seal the jar better and reduce the danger of oxygen infiltration, but they are entirely successful in the rigorous conditions met in food processing practice. Consequently, they meet the requirements of a baby food cap much better than have the caps in the past. In contradistinction to previous caps, this new closure forms its seal against the glass on the side and on the corner radius finish, but shuts off the flow of compound across the top finish of the jar.

Figure 2:
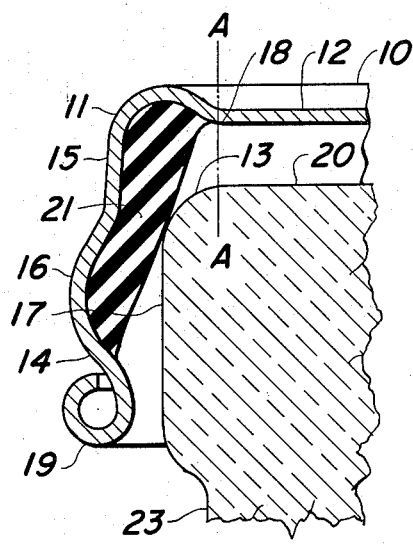
Figure 3:
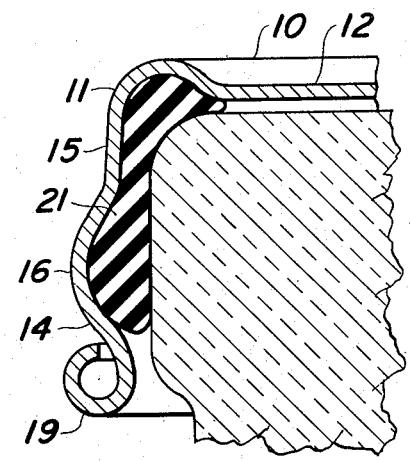
Figure 4:
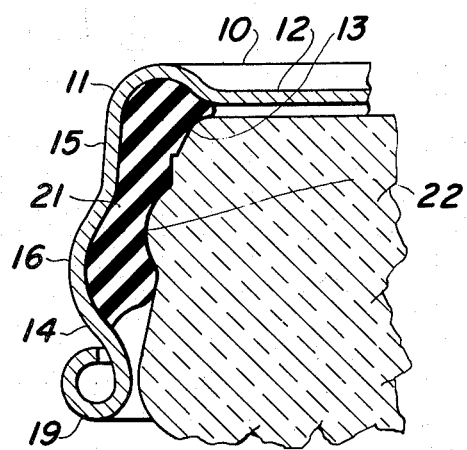

In the figures:

Figure 1 is a vertical cross section of the effective sealing area of the closure, Figure 2 is a cross section showing the finish portion of a conventional glass jar entering the closure, Figure 3 is a cross section showing the closure in full closing position on the jar shown in Figure 2, and Figure 4 is a cross section showing the closure in full closing position on a jar having an alternative commercial side seal finish.

Glass cannot be made to exact dimension. The glass industry has established rigid specifications for finish and size of the jar. It has based its dimensional specifications and tolerance limits on the "ideal" dimension for the jar in question. All critical dimensions in the specification and the claims refer basically to the "ideal" dimension established by the glass container industry.

The improved cap is distinguished by an extremely narrow, inwardly facing top channel 11, formed by upthrusting the metal in a peripheral ring about the top panel 12 and thus making the outside wall of channel 11 coextensive with the top periphery of the closure 10. The depth of the top channel 11 as measured from the plane of the interior surface of the top panel 12 is from 0.4 mm. to 0.9 mm. The minor diameter of channel 11, i. e., the point at which it merges into the plane of the top panel 12 should ideally be equal to the ideal diameter of the jar measured at the intersection of the sealing surface radius 13 and the flat "top finish" 20 or, referring to Figure 2, the arc of the top channel 11 and the arc of the glass finish should merge with their respective horizontal flat surfaces along the common line A—A. The permissible tolerance from this dimension is plus or minus 0.5 mm. The major diameter of channel 11 must not be less than the maximum diameter of the effective sealing surface of the container.

Immediately below the channel 11 the skirt 14 is formed into a cylindrical or slightly tapering portion 15. The maximum depth of portion 15 is set by the requirement that a substantial portion of the circumferential channel 16 which lies immediately below portion 15 must lie opposite to the effective sealing surface of the glass finish when the closure is in sealing position. (See Figures 3 and 4.)

The closure terminates in the usual curl 19 which may be turned outwardly, or inwardly as desired. If it is turned inwardly, its wall forms the lower boundary of channel 16. The diameter of the closure at the bottom of the skirt should not be less than the maximum diameter of the sealing surface and should not be greater than 0.8 mm. in excess of the outside diameter of the top channel 11.

Figure 2 shows a usual straight side seal finish jar entering a closure. It should be noticed that the gap between the top finish 20 of the jar and the panel 12 narrows rapidly as the closure comes to its final seal, but that the space between the side finish 17 and the portion 15 remains substantially constant. Consequently, the escape route for the displaced sealing compound lies through this gap, whereas the approach of the glass finish toward the point 18 corresponds in its action to a valve shutting off the flow of compound. For maximum effectiveness in this valving action, the inner radius of the channel 11 and the finish radius 13 of the glass should meet as specified. Since the sealing material possesses both elastic and viscous properties at the temperatures and at the pressures of sealing, it can transmit thrust, and the major thrust developed by glass radius 13 is directed towards the channel 11. The compound, therefore, is packed into the channel, rather than being displaced from it. It does not extend into the headspace and does not pull away from the enamel. The heavily distorted metal which might be subject to pinpoint perforation if left unprotected is completely and permanently covered by a molded, pressure retained, impermeable, protective mass. Clearance between portion 15 and side finish 17 cannot be too wide; otherwise, the compound could flow so easily that the degree of pressure necessary to form a good seal on the radius finish would not be developed.

A suitable clearance results if the depth of portion 15 as measured from the intersection of the plane of the interior surface of top panel 12 with the skirt 14 is at least equal to the radius of the inner quadrant of channel 11, if the maximum dimension of the major diameter of channel 11 measured at this same intersection is such that the gap between inner wall of the skirt at this point and the vertical projection of maximum diameter of the effective sealing surface is not greater than 0.8 mm., and if portion 15 is either perpendicular to the plane of the interior surface of top panel 12 or tapers outwardly from the perpendicular to that plane at an angle not exceeding 15°.

Channel 16 is provided not only to stiffen the closure and prevent it flaring outwardly under the closing pressure, but it restrains the flow of compound outwardly between the finish and the curl and insures that a wide, fully molded side seal will be formed on the effective sealing surface. Since to do this it must hold the compound which has been displaced and also must initially hold some of the compound which will form the side seal, I have found that its included volume should be at least twice the volume included in channel 11. The container lining composition forming sealing element 21 should be placed so that it substantially fills both channels without extending beyond the confines of either channel.

The anchoring of the sealing material in channel 11 resists the tendency in the initial closing of the jar to skid the sealing material out of position and across the top panel. The circumferential anchoring channel 16 on the depending skirt provides sufficient additional adhesion area and mechanical holding capacity to prevent the displacement of the lining compound upwardly as the lid is seated on the jar. At the same time, the open area at the lower edge of holding channel 16 is a zone of much lower pressure. Therefore, as the closure seats, the tendency is for the lining composition to flow into this space, and since in so doing it must also flow against the cylindrical sealing surface of the jar, the effective area of contact between the sealing composition and the glass is made considerably wider than in present practice. Not only that, but the compound is molded into all pits and channels in the glass surface.

The performance of such caps both in preventing microscopic gas leaks between the gasket and the glass and in preventing pinholing in the lid areas which have been subjected to mechanical stress is most gratifying. All stressed areas are protected by thick, compressed, adhesively united sealing composition whenever the cap is in closed position on the jar. Also, since the seal has been molded to fit the particular glass finish, the cap reseals effectively and securely.

The terminology referring to the glass parts used in the specification and claims is the following: All portions of the jar mouth down to the neck 23 (Figure 2) are known as the "finish." The arc 13 connecting the top and side portions of the finish is known as the "sealing surface radius." "Sealing ring" refers to the vertical wall of the side finish 17, as shown in Figure 2, or if the side seal jar is of the holding ridge type, as shown at 22 in Figure 4, the term refers to the whole extent of the contoured finish. "Maximum diameter of the effective sealing surface" means, in the case of the jar shown in Figure 2, the maximum diameter of the sealing ring; but in the case of the jar shown in Figure 4, it means the maximum diameter of the holding ridge. "Maximum" means the maximum tolerance dimension added to the "ideal" dimension which has been established for the particular jar.

I claim:

1. A closure having a top, an integral depending skirt of substantially greater diameter than the cap receiving finish of a container to which it is to be applied, and a sealing material to provide a seal between said closure and such container finish, said cap at its top having a central panel defined by an upstanding circumferential channel, the inner wall of which is integral with said panel and the outer wall of which is continuous with said depending skirt and extends downwardly and within fifteen degrees of a right angle to the said top panel, this said downwardly extending portion of the skirt merging into a circumferential outwardly extending channel in the skirt and said skirt below said channel terminating in a finished edge, the said sealing material filling the area of the inner surface of the cap defined by the inner wall surface of said upstanding channel and the inner wall surface of said channel in the skirt and covering the area of the inner wall surface of the skirt between the channels, and presenting a generally outwardly inclined surface extending continuously from substantially the inner edge of the top channel to substantially the lower edge of the channel in said skirt.

2. A closure according to claim 1, wherein the inner wall of said top channel has a minor diameter not less than 0.5 mm. less and not greater than 0.5 mm. more than the "ideal diameter" of the intersection of the sealing surface radius with the uppermost surface of the container to which the closure is intended to be applied, the inner wall of said channel merging with the top panel within the given tolerance on a circle substantially corresponding to the circle formed by the intersection of the sealing surface radius with the top finish of the container, the approach of said inner channel wall and the sealing surface radius as the closure is seated being effective to pinch off the flow of plastic sealing compound and to prevent it from flowing across the top finish into the head-space.

3. A closure according to claim 2, wherein a major diameter at the intersection of the plane defined by the inner surface of the top panel being not less than the maximum diameter of the effective sealing surface of the container and not greater than 1.5 mm. in excess thereof.

4. A container according to claim 2, wherein a major diameter at the intersection of the plane defined by the inner surface of the top panel being not less than the maximum diameter of the effective sealing surface of the container and not greater than 1.5 mm. in excess thereof, and a depth relating to the interior surface of said top panel between 0.4 mm. and 0.9 mm.

References Cited in the file of this patent

UNITED STATES PATENTS

| 829,980 | Lorenz | Sept. 4, 1906 |
| 2,437,515 | Glocker | Mar. 9, 1948 |
| 2,463,701 | Krueger | Mar. 8, 1949 |
| 2,471,565 | Glocker | May 31, 1949 |
| 2,481,111 | Griswold | Sept. 6, 1949 |
| 2,484,039 | Krueger | Oct. 11, 1949 |